United States Patent [19]

Hirose et al.

[11] Patent Number: 4,811,269

[45] Date of Patent: Mar. 7, 1989

[54] BIT SLICE MULTIPLICATION CIRCUIT

[75] Inventors: Kenji Hirose, Hitachi; Tadaaki Bandoh, Ibaraki; Hidekazu Matsumoto, Hitachi; Shinichiro Yamaguchi, Hitachi; Hirokazu Hirayama, Hitachi; Hiroaki Nakanishi, Hitachi, all of Japan

[73] Assignees: Hitachi, Ltd.; Hitachi Engineering Co., Ltd., both of Tokyo, Japan

[21] Appl. No.: 916,695

[22] Filed: Oct. 8, 1986

[30] Foreign Application Priority Data

Oct. 9, 1985 [JP] Japan .................................. 60-223624

[51] Int. Cl.$^4$ .............................................. G06F 7/52
[52] U.S. Cl. ...................................... 364/754; 364/759
[58] Field of Search ................. 364/754, 757, 759–760

[56] References Cited

U.S. PATENT DOCUMENTS 4,594,679 6/1986 George et al. .................... 364/754
4,644,491 2/1987 Ookawa et al. ................ 364/754 X

FOREIGN PATENT DOCUMENTS 58-101343 6/1983 Japan .................................. 364/754
60-83140 5/1985 Japan .................................. 364/754

OTHER PUBLICATIONS

Kwang, "Computer Arithmetic Principles, Architecture and Design", Chapter 5, John Wiley & Son Inc., 1979.

Primary Examiner—Gary V. Harkcom
Assistant Examiner—Tan V. Mai
Attorney, Agent, or Firm—Antonelli, Terry & Wands

[57] ABSTRACT

A bit slice multiplication circuit operating to slice a multiplier, produce products for the sliced multipliers and a multiplicand and sum the products to obtain the multiplication result. The circuit includes a slicing unit for slicing the multiplicand, multiplying units corresponding in number to the number of sliced multiplicands, and adding units provided in correspondence to the multiplying units and implementing summation for multiplication results from corresponding multiplying units while shifting the sliced portions of the multiplicand at each multiplying operation for sliced multipliers and multiplicands by the multiplying units, the multiplication result being obtained by summing all summation results produced by the adding units.

4 Claims, 12 Drawing Sheets

BIT SLICE MULTIPLICATION CIRCUIT

BACKGROUND OF THE INVENTION

1. Field of the Invention

This invention relates to a multiplication circuit used in a digital operational processor and, particularly, to a multiplication circuit for implementing at a high speed the multiplication process for the fractional part in floating point operations.

2. Description of the Prior Art

A conventional high-speed multiplication circuit, as proposed in Japanese Patent Unexamined Publication No. 58-101343 for example, comprises means for dividing or slicing a multiplier, a decoder for decoding the resulting sliced multipliers, a multiplying unit made of a multiple-gate for multiplying the decoded multipliers with a multiplicand, a carry-save-adder (CSA) which is a multi-input adder for summing sequentially the results of multiplication for the sliced multipliers and the multiplicand, and a carry-propagating adder (CPA) for adding the carry component to the sum component produced by the CSA to produce a final multiplication result. The multiplier slicing method is a known technique as has been introduced in Chapter 5 of "Computer Arithmetic PRINCIPLES, ARCHITECTURE AND DESIGN" by Kai Hwang published in 1979 by John Wiley & Sons Inc. The multiplying operation by the above-mentioned multiplication circuit takes place in such a way that the multiple-gate multiplies the lowest-order multiplier decoded by the decoder with a multiplicand to produce a partial product, the CSA implements summation to produce a partial sum and partial carry, the multiple-gate multiplies the next higher-order multiplier with the multiplicand to produce a partial product, the CSA sums the partial product and the previously obtained partial sum and partial carry which are shifted by a certain number of bits for place adjustment so as to produce a partial sum and partial carry, and the process for producing a new partial sum and partial carry is repeated, each time a partial product is produced, by summing the partial product and a previous partial sum and partial carry while shifting them by a certain number of bits. The conventional multiplication technique necessitates the bit shift operation for each of the partial sum and partial carry, which results disadvantageously in an increased number of terminals used for the shift operation when the multiplying unit is constructed using a plurality of LSI devices.

SUMMARY OF THE INVENTION

An object of this invention is to overcome the prior art deficiency and provide a high-speed multiplication circuit which uses a smaller number of terminals.

The inventive multiplication circuit comprises means for slicing a multiplicand, multiplying units equal in number to the resulting number of sliced multiplicands, shift means which puts each sliced multiplicand into each multiplying unit, while shifting its bit position cyclically each time multiplication with a sliced multiplier takes place, and adding units provided in correspondence to the multiplying units for summing the multiplication results of corresponding multiplying units, wherein the multiplicand is shifted at the stage of multiplication for the multiplicand and multiplier, thereby eliminating the need for the shift operation in summing a partial product and a previous partial sum and partial carry by each multiplying unit. The number of shift operations is almost halved, since only shifting for the multiplicand is needed, as compared with the conventional multiplication technique which involves two separate shift operations for the partial sum and partial carry.

As an embodiment of this invention, a register is provided between the multiplying unit and the adding unit to store the result of the multiplication for the multiplicand and sliced multiplier, with the intention of implementing multiplication for the multiplicand and the next sliced multiplier concurrently with the summing process for the stored multiplication result by the adding unit, whereby speed-up of the multiplication process is achieved. In contrast to the conventional multiplying system, in which the multiplying process and adding process take place serially and are repeated, with the result that the high-speed capability of the adding unit has not been used effectively, the present invention achieves the speed-up of the multiplication process through the provision of the above-mentioned register.

According to this invention, the number of shift operations can be nearly halved as compared with the conventional system, and when the multiplication circuit is constructed using a plurality of LSI devices, the number of terminals used for the shift operation can be reduced. In addition, this invention achieves a faster multiplication process as compared with the conventional system.

BRIEF DESCRIPTION OF THE DRAWINGS

These and other objects and advantages of the present invention will become more apparent from the following detailed description taken in conjunction with the accompanying drawings. In the drawings.

DESCRIPTION OF THE PREFERRED EMBODIMENTS

Figure 1:
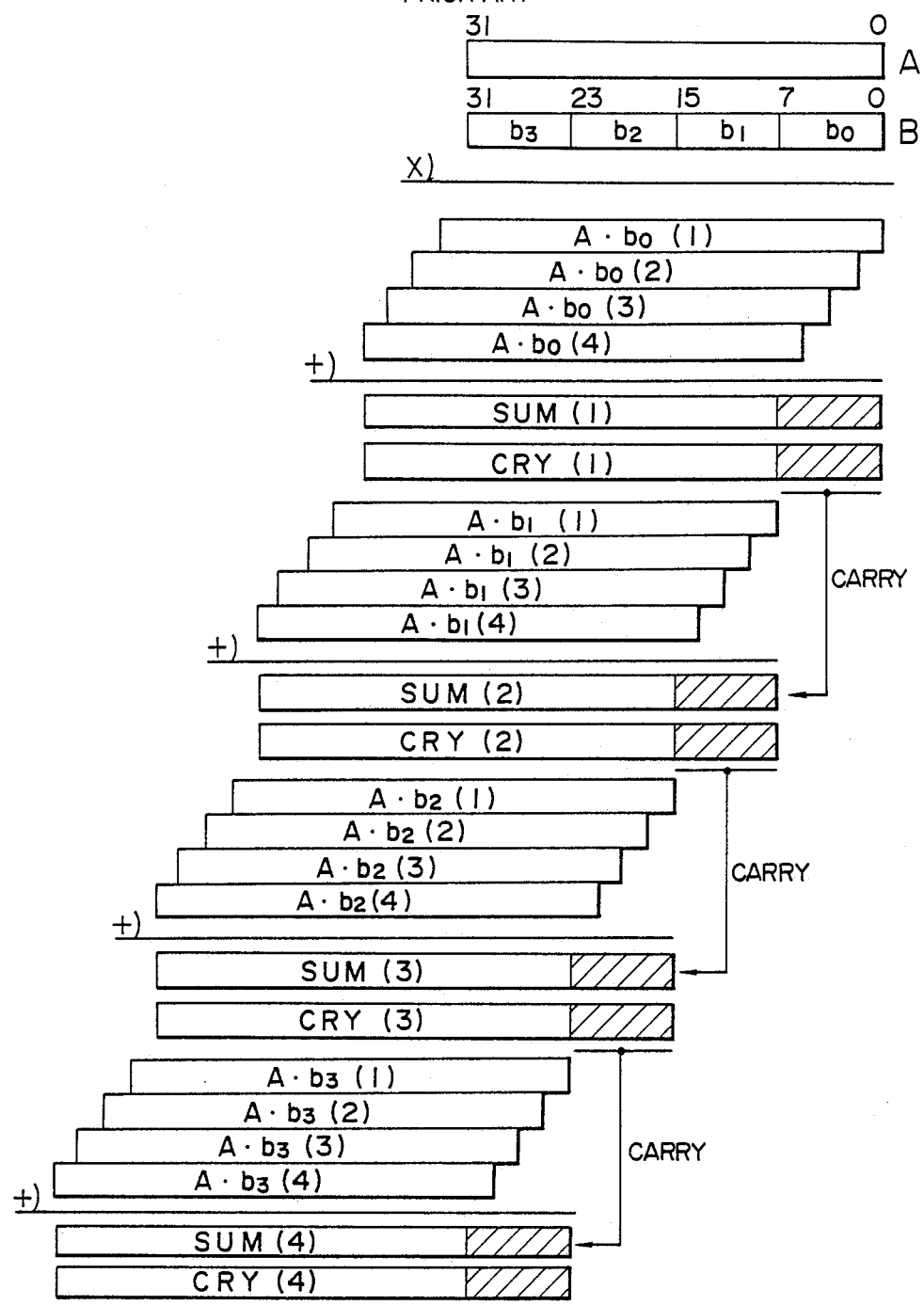
FIG. 1 is a diagram showing the processing procedure of the conventional multiplication system.

Before entering the embodiment of this invention, the prior art multiplication process will first be described with reference to FIG. 1. The figure shows the procedure of a multiplying operation for a 32-bit multiplicand A and a 32-bit multiplier B by the conventional multiplication system. The multiplier is sliced into n pieces of 2m-bit data, and the multiplying operation is executed in n+1 machine cycles. The partition parameters are set as m=4 and n=4 in FIG. 1.

Initially, the lowest-order 8-bit portion $b_0$ is decoded with a decoder to obtain four kinds of multipliers. Based on the multipliers from the decoder, the multiple-gate produces multiples $A \cdot b_0(1)$ through $A \cdot b_0(4)$ for the multiplicand, and the CSA sums the multiples to obtain a partial sum SUM (1) and a partial carry CRY (1).

In the next machine cycle, the next 8-bit portion $b_1$ of the multiplier B is decoded to produce partial products $A \cdot b_1(1)$ through $A \cdot b_1(4)$, and the CSA sums the previously obtained SUM (1) and CRY (1) shifted right by eight bits each and the above partial products to obtain a partial sum SUM (2) and partial carry CRY (2). For the 8-bit shift-off portion of the SUM (1) and CRY (1) (hatched portions in FIG. 1), only the carry as a result of addition of these portions is produced and held. The reason is that in the floating point system of this case, the fractional part has a constant number of bits, and therefore when the hatched portions are truncated as values in bit positions lower than the lowest bit of the ultimate multiplication result, their carries need to be added to the portion higher in bit position than the hatched portions in order to obtain the ultimate multiplication result.

In the same manner, SUM (3) and CRY (3), and SUM (4) and CRY (4) are calculated sequentially, and in the last machine cycle the CPA sums the partial sum SUM (4) and partial carry CRY (4) to complete the multiplying operation.

In this system, however, shift operations are required for the partial sum and partial carry of the CSA output, and for the multiplying process of 2m bits a 2m bit shift operation is needed separately for each of the partial sum and partial carry. This results in an increased number of terminals used for the shift operation when the multiplication circuit is constructed using a plurality of LSI devices.

The present invention is intended to solve the foregoing prior art problem. The following describes the procedure of a multiplying operation implemented by the inventive multiplication circuit with reference to FIG. 2, in which a 32-bit multiplying unit is sliced into four 8-bit multiplying units S-1 through S-4.

Initially, the lowest-order 8-bit portion $b_0$ of the multiplier B is multiplied by each of the 8-bit portions $a_0$ through $a_3$ of the multiplicand A, with the result that the unit S-1 receives the low-order 8 bits of $a_0 \cdot b_0$ and high-order 8 bits of $a_3 \cdot b_0$, the unit S-2 receives the high-order 8 bits of $a_0 \cdot b_0$ and low-order 8 bits of $a_1 \cdot b_0$, the unit S-3 receives the high-order 8 bits of $a_1 \cdot b_0$ and low-order 8 bits of $a_2 \cdot b_0$, and the unit S-4 receives the high-order 8 bits of $a_2 \cdot b_0$ and low-order 8 bits of $a_3 \cdot b_0$ (step a-1). Subsequently, the CSA sums the entered partial products to produce a partial sum SUM (1) and partial carry CRY (1) (step b-1). In this case, the partial product $a_0 \cdot b_0$ in S-1 is not actually added, but only the carry from the highest-order bit is evaluated for use in the later calculation of the higher-order bit portion, although the hatched partial product ($a_0 \cdot b_0 - L$) in the figure is to be truncated.

In the next step, the second multiplier $b_1$ is multiplied by the multiplicand A, with the result that the unit S-1 receives the high-order 8 bits of $a_2 \cdot b_1$ and low-order 8 bits of $a_3 \cdot b_1$, the unit S-2 receives the low-order 8 bits of $a_0 \cdot b_1$ and high-order 8 bits of $a_3 \cdot b_1$, the unit S-3 receives the high-order 8 bits of $a_0 \cdot b_1$ and low-order 8 bits of $a_1 \cdot b_1$, and the unit S-4 receives the high-order 8 bits of $a_1 \cdot b_1$ and lower-order 8 bits of $a_2 \cdot b_1$ (step a-2). Since the input partial products are shifted by eight bits to the left relative to the result of step a-1, the summation in step a-2 by the CSA for the previous partial sum SUM (1) and partial carry CRY (1) with the partial products does not necessitate the right shift for the SUM (1) and CRY (1) (step b-2). In this case, summation does not take place for $a_0 \cdot b_1 - L$, SUM (1) and CRY (1) as hatched in the figure with $a_3 \cdot b_1 - U$ in the unit S-2, but only the carry from the highest-order bit as a result of addition to the carry which has been produced from $a_0 \cdot b_0 - L$ is evaluated. In the same manner, steps a-3, b-3, a-4 and b-4 are carried out, the finally the CPA sums SUM (4) and CRY (4) to complete the mutiplying operation.

According to this invention, as described above, the multiplicand is shifted cyclically when fed to the multiplying unit each time it is multiplied by a sliced multiplier, and this scheme eliminates the need of the shift operation for a partial sum and partial carry in adding to a partial product at each multiplying operation by the conventional technique, whereby the number of shift operations is nearly halved.

Figure 3:
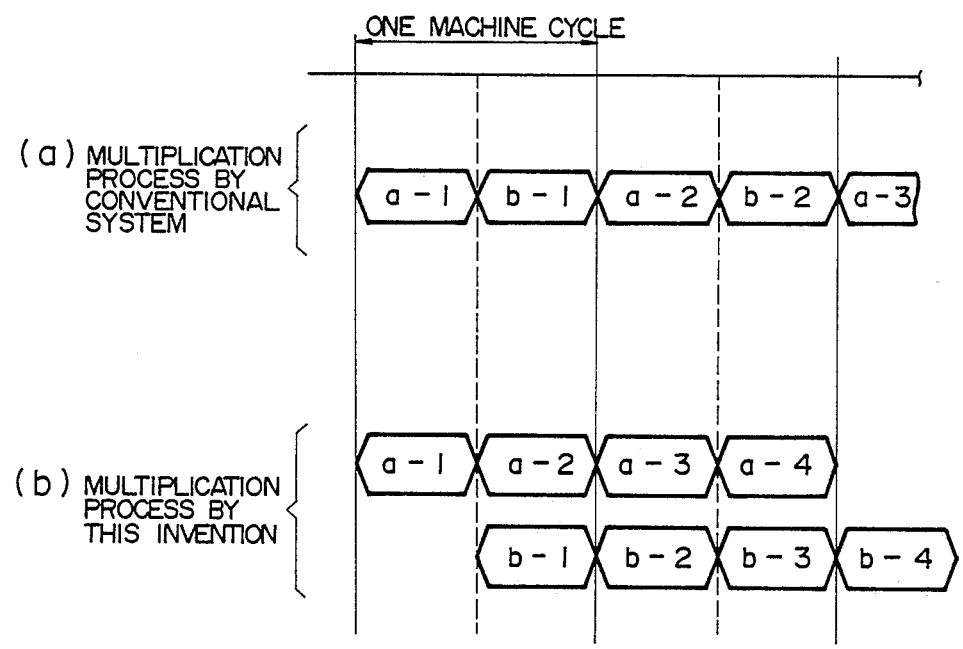
FIG. 3 is a timing chart of the multiplication process.

FIG. 3 shows a timing chart of the multiplication processes implemented by the conventional multiplication circuit (shown by (a)) and that implemented by the inventive multiplication circuit which has a register in the stage following each multiplying unit (shown by (b)). In the conventional system (a), the process (a-1) for producing a partial product is followed by the addition (b-1) of the result to the previous partial sum and partial carry and therefore only a set of partial sum and partial carry is obtained in one machine cycle, whereas in the inventive multiplication circuit the provision of a register stage following the multiplying unit enables concurrent processes for producing the next partial product (a-2) and for adding the former partial product to the previous partial sum and partial carry (b-1), and therefore a set of a partial sum and a partial carry can be obtained in a half machine cycle and the multiplication process can be sped up.

Next, the multiplication circuit embodying the present invention will be described.

Figure 4:
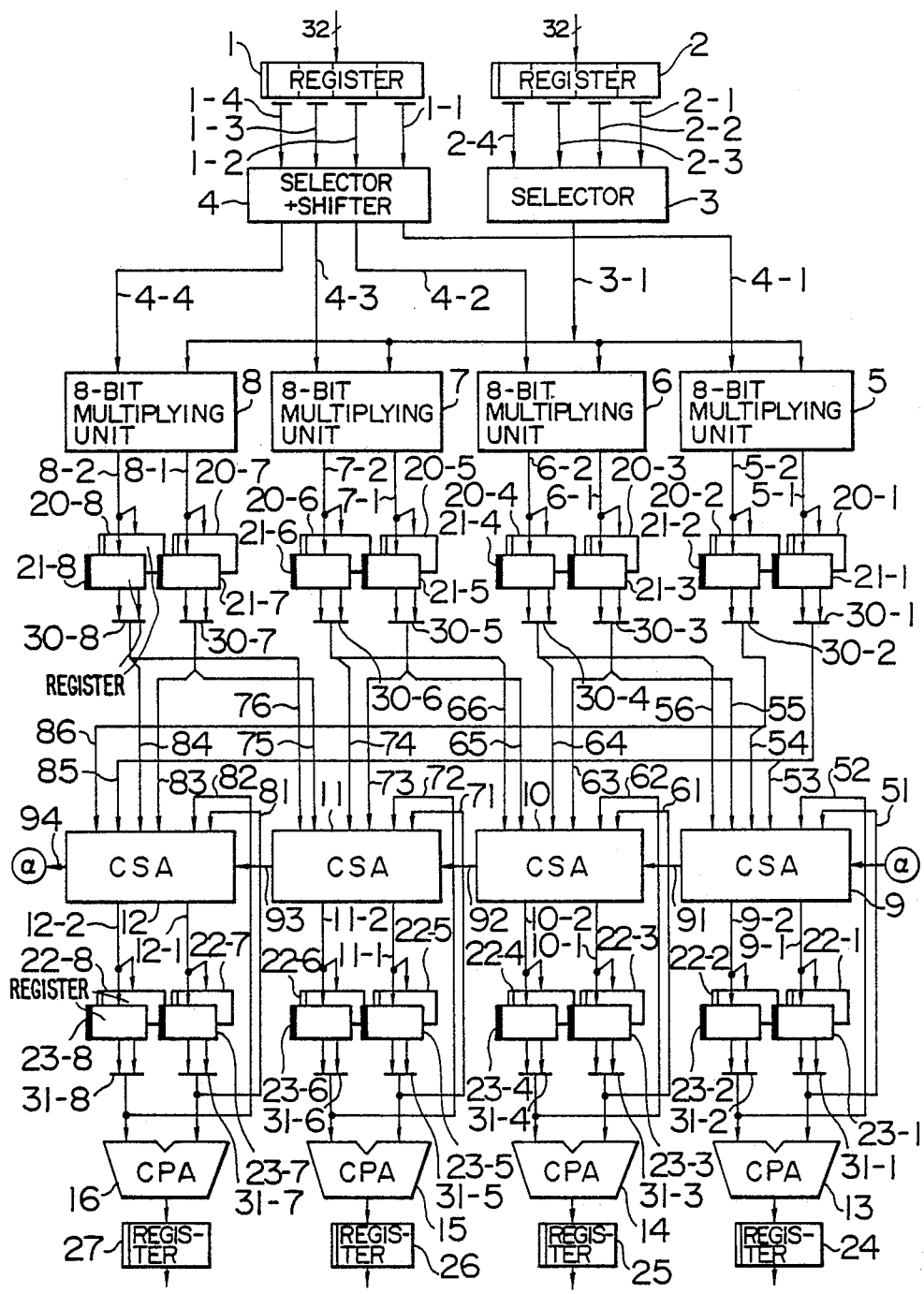
FIG. 4 is a block diagram of the multiplication circuit embodying this invention.

FIG. 4 shows the overall arrangement of the 32-bit multiplication circuit embodying the present invention. The circuit consists of a register 1 for holding the multiplicand, a register 2 for holding the multiplier, a selector 3 for selecting one of four sliced multipliers, a selector 4 for arranging arbitrarily four sliced multiplicands 8-bit multiplying units 5 through 8 each for producing a 16-bit partial product made up of a sum component and carry component from an 8-bit multiplier and multiplicand, registers 20-1 through 20-8 and 21-1 through 21-8 for latching the outputs of the 8-bit multiplying units 5 through 8, CSAs 9 through 12 each for summing a partial product and a set of a partial sum and a partial carry, registers 22-1 through 22-8 and 23-1 through 23-8 for latching the outputs of the CSAs 9 through 12, CPAs 13 through 16, each for summing a partial sum and a partial carry at the end of the multiplying operation, registers 24 through 27 for latching the multiplication result, and 2-to-1 selectors 30-1 through 30-8 and 31-1 through 31-8. Among these components, the registers 1, 2, 20-1 through 20-8 through 20-8, 22-1 through 22-8 and 24 through 27 are constructed with through-latches which are made through in the former half of each machine cycle, while the registers 21-1 through 21-8 and 23-1 through 23-8 are constructed with through-latches which are made through in the latter half of each machine cycle.

Figure 5:
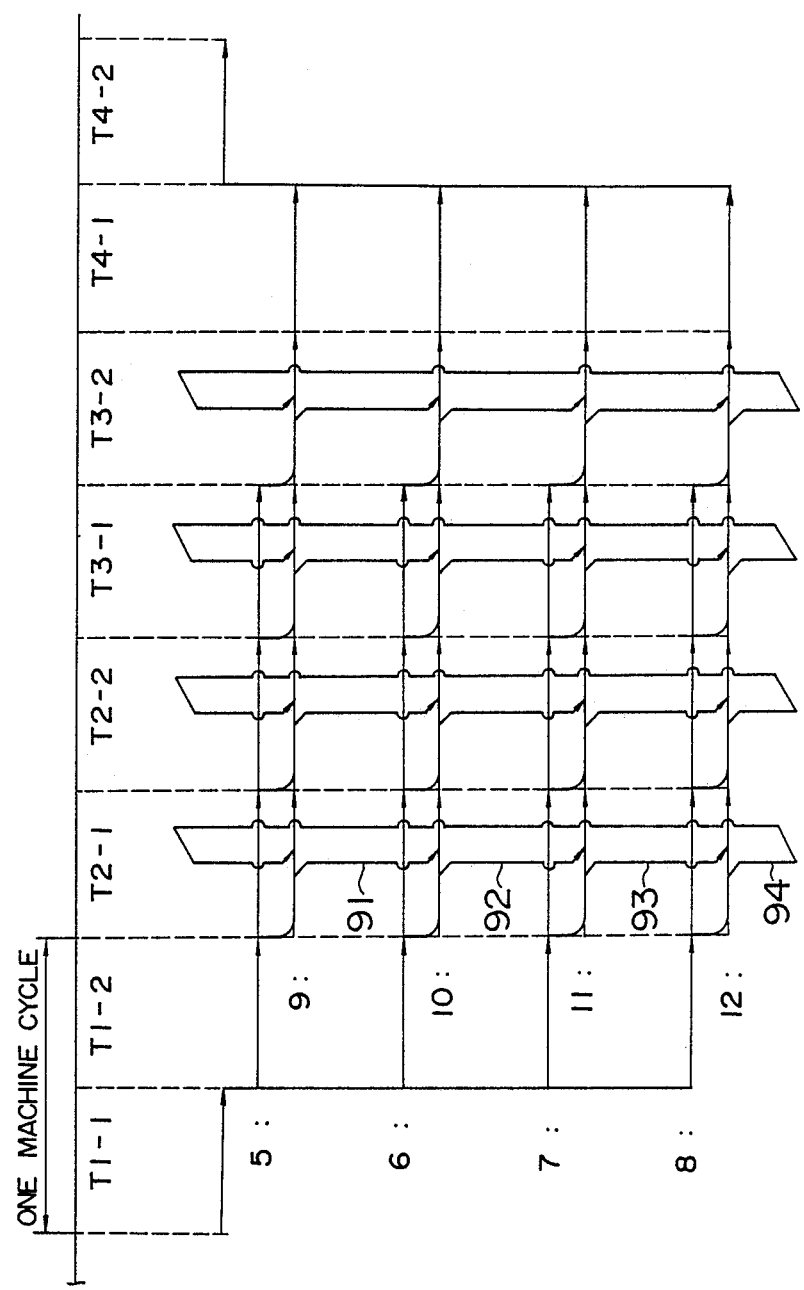
FIG. 5 is a diagram used to explain the multiplication circuit shown in FIG. 4.

Next, the operation of the multiplication circuit shown in FIG. 4 will be described using FIGS. 2 and 5.

Initially, in the former half of the first machine cycle (T1-1 in FIG. 5), a multplicand and a multiplier are set in the registers 1 and 2, respectively. In the latter half of the first machine cycle (T1-2 in FIG. 5), the selector 3 selects the lowest-order 8-bit portion 2-1 of the multiplier and places it on the signal line 3-1, while the selector 4 places the lowest-order 8-bit portion 1-1 of the multiplicand on the signal line 4-2, the second 8-bit portion on the line 4-3, the third 8-bit portion 1-3 on the line 4-4, and the highest-order 8-bit portion 1-4 on the line 4-1. The 8-bit multiplying units 5 through 8 receive the sliced multiplier 3-1 and sliced multiplicands 4-1 through 4-4 to produce partial products made up of sum components 5-1, 6-1, 7-1 and 8-1 and carry components 5-2, 6-2, 7-2 and 8-2, and store the results in the registers 21-1 to 21-8. The registers 23-1 to 23-8 are kept cleared.

Subsequently, in the former half of the second machine cycle (T2-1 in FIG. 5), the selector 3 places the second 8-bit portion 2-2 of the multiplier on the line 3-1, while the selector 4 places the lowest-order 8-bit portion 1-1 of the multiplicand on the line 4-3, the second 8-bit portion 1-2 on the line 4-4, the third 8-bit portion 1-3 on the line 4-1, and the highest-order 8-bit portion 1-4 on the line 4-2, and the 8-bit multiplying units 5 through 8 produce partial products in the registers 20-1 through 20-8. At the same time, the selectors 30-1 through 30-8 pass the contents of the registers 21-1 through 21-8. Then, as a result of the step a-1 in FIG. 2, the sum and carry components of $a_3 \cdot b_0 - U$ are placed on the signal lines 53 and 54, the sum and carry components of $a_0 \cdot b_0 - L$ are placed on the lines 55 and 56, the sum and carry components of $a_0 \cdot b_0 - U$ are placed on the lines 63 and 64, the sum and carry components of $a_1 \cdot b_0 - L$ are placed on the lines 65 and 66, the sum and carry components of $a_1 \cdot b_0 - U$ are placed on the lines 73 and 74, the sum and carry components of $a_2 \cdot b_0 - L$ are placed on the lines 75 and 76, the sum and carry components of $a_3 \cdot b_0 - L$ are placed on the lines 85 and 86, and the sum and carry components of $a_2 \cdot b_0 - U$ are placed on the lines 83 and 84. The selectors 31-1 through 31-8 select the contents of the registers 23-1 through 23-8. All inputs to the CSAs 9 through 12 are now ready, and as a result of the first processing cycle, partial sums 9-1, 10-1, 11-1 and 12-1 and partial carries 9-2, 10-2, 11-2 and 12-2 are stored in the registers 22-1 through 22-8 (step b-1 in FIG. 2). The signal lines 91 through 94 are used to pass the carries created in the summing operations of the CSAs 9 through 12 on to the left-adjacent CSAs. The CSA 9 does not actually add $a_0 \cdot b_0 - L$ shown by hatching in FIG. 2 to $a_3 \cdot b_0 - U$, but merely produces a carry result.

In the latter half of the second machine cycle (T2-2 in FIG. 5), the selector 3 places the third 8-bit portion 2-3 of the multiplier on the line 3-1, and the selector 4 places the lowest-order 8-bit portion 1-1 of the multiplicand on the line 4-4, the second 8-bit portion 1-2 on the line 4-1, the third 8-bit portion 1-3 on the line 4-2, and the highest-order 8-bit portion 1-4 on the line 4-3. The selectors 30-1 through 30-8 pass the contents of the registers 20-1 through 20-8, and the selectors 31-1 through 31-8 pass the contents of the registers 22-1 through 22-8. As a result, the partial products are stored in the registers 21-1 through 21-8 at step a-3 in FIG. 2, and the partial sums and partial carries are stored in the registers 23-1 through 23-8 at step b-2 in FIG. 2.

Figure 2:
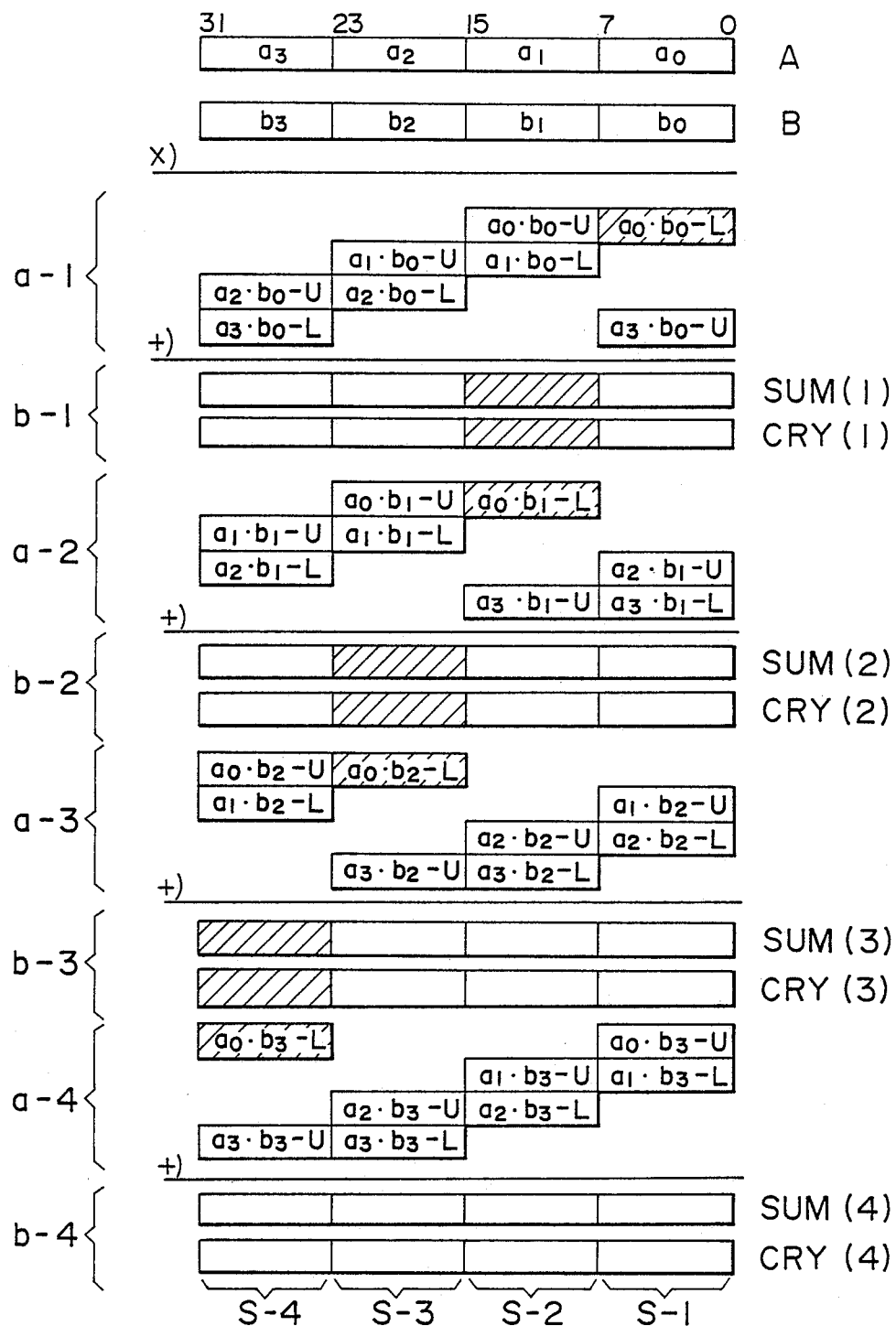
FIG. 2 is a diagram showing the processing procedure of a multiplying operation according to this invention.

Summation by the CSA 10 for $a_0 \cdot b_1 - L$, shown by hatching in FIG. 2, and the contents of the registers 22-3 and 22-4, all having the same number of bits, takes place separately from summation by the CSA 10 for $a_3 \cdot b_1 - U$, and only a carry result of the summation is evaluated. This process and the similar process by the CSA 9 in the former half of the second machine cycle are carried out in such a way that the lowest-order bit portion of the multiplicand, the lower-half bit portion of the product of $b_0$ or $b_1$, which is a sequentially fetched multiplier, and the corresponding contents of the registers 22-1 through 22-8 and 23-1 through 23-8 are summed cyclically and separately from the summation for the higher-half bit portion of the output of the cyclically lower-adjacent multiplying unit so as to evaluate a carry result. The cyclically lower-adjacent multiplying unit is, for example, the multiplying unit 5 when the multiplication $a_0 \cdot b_0$ is implemented by the multiplying unit 6 in the former half of the second machine cycle. In other machine cycles, the same processing takes place for the hatched portions of FIG. 2.

In the former half of the third machine cycle (T3-1 in FIG. 5), the selector 3 places the highest-order 8-bit portion 2-4 of the multiplier on the line 3-1, and the selector 4 places the lowest-order 8-bit portion 1-1 of the multiplicand on the line 4-1, the second 8-bit portion 1-2 on the line 4-2, the third 8-bit portion 1-3 on the line 4-3, and the highest-order 8-bit portion 1-4 on the line 4-4. The selectors 30-1 through 30-8 output the contents of the registers 21-1 through 21-8, and the selectors 31-1 through 31-8 output the contents of the registers 23-1 through 23-8. Then, the partial products are stored in the registers 20-1 through 20-8 at step a-4 in FIG. 2, and the partial sums and carries are stored in the registers 22-1 through 22-8 at step b-3 in FIG. 2.

In the latter half of the third machine cycle (T3-2 in FIG. 5), the selectors 30-1 through 30-8 output the contents of the registers 20-1 through 20-8, while the selectors 31-1 through 31-8 output the contents of the registers 22-1 through 22-8, and the partial sums and carries are stored in the registers 23-1 through 23-8 at step b-4 in FIG. 2.

In the former half of the fourth machine cycle (T4-1 in FIG. 5), the selectors 31-1 through 31-8 select the contents of the registers 23-1 through 23-8 so that the CPAs (carry propagating adders) 13 through 16 sum the partial sums and the partial carries to obtain the final multiplication result, and it is stored in the registers 24 through 27.

In the latter half of the fourth machine cycle (T4-2 in FIG. 5), the multiplication result held in the registers 24 through 27 is transferred.

As described above, the selector 3 fetches the lowest-order 8 bits to the highest-order 8 bits of the multiplier sequentially in each half machine cycle and at the same time the selector 4 rotates or shifts cyclically the multiplicand to the left by eight bits in each half machine cycle in carrying out the multiplication operation.

Figure 6:
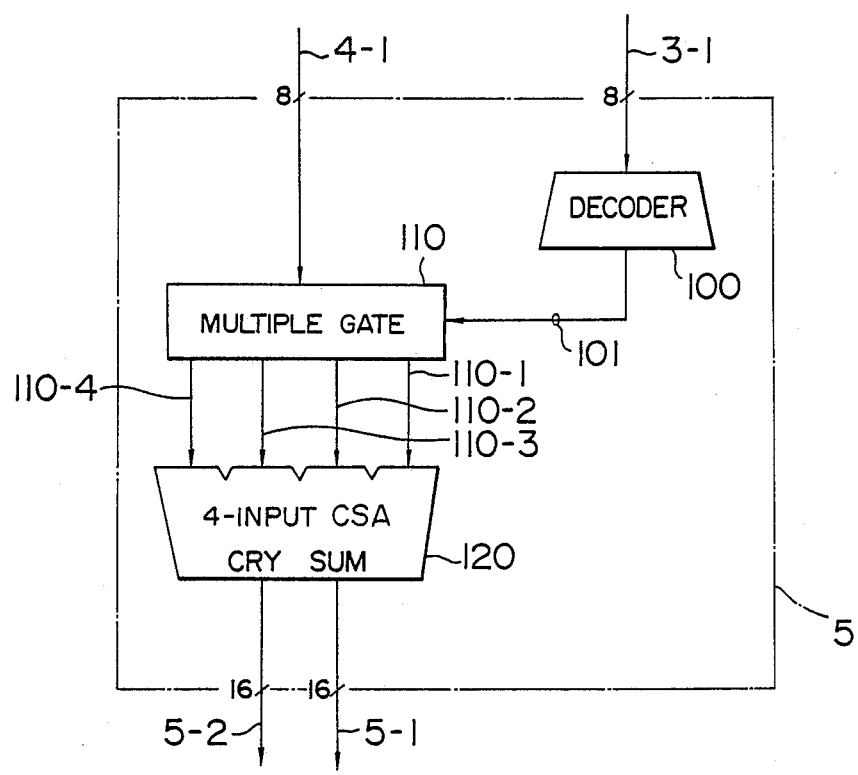
FIG. 6 is a diagram used to explain the 8-bit multiplying unit used in the multiplication circuit shown in FIG. 4.

FIG. 6 shows the arrangement of the 8-bit multiplying unit 5 in FIG. 4. The unit 5 consists of a decoder 100 which decodes an 8-bit multiplier 3-1 to produce four kinds of multiples 101, a multiple-gate 110 which produces four partial products 110-1 through 110-4 from the multiples 101 provided by the decoder 100 and an 8-bit multiplicand, and a 4-input CSA 120 which sums the four partial products 110-1 through 110-4 from the multiple-gate 110 to produce a partial product made up of a 16-bit sum component 5-1 and a carry component 5-2. The remaining 8-bit multiplying units 6, 7 and 8 shown in FIG. 4 have exactly the same arrangement as that of the 8-bit multiplying unit 5, and their explanation will be omitted.

Figure 7:
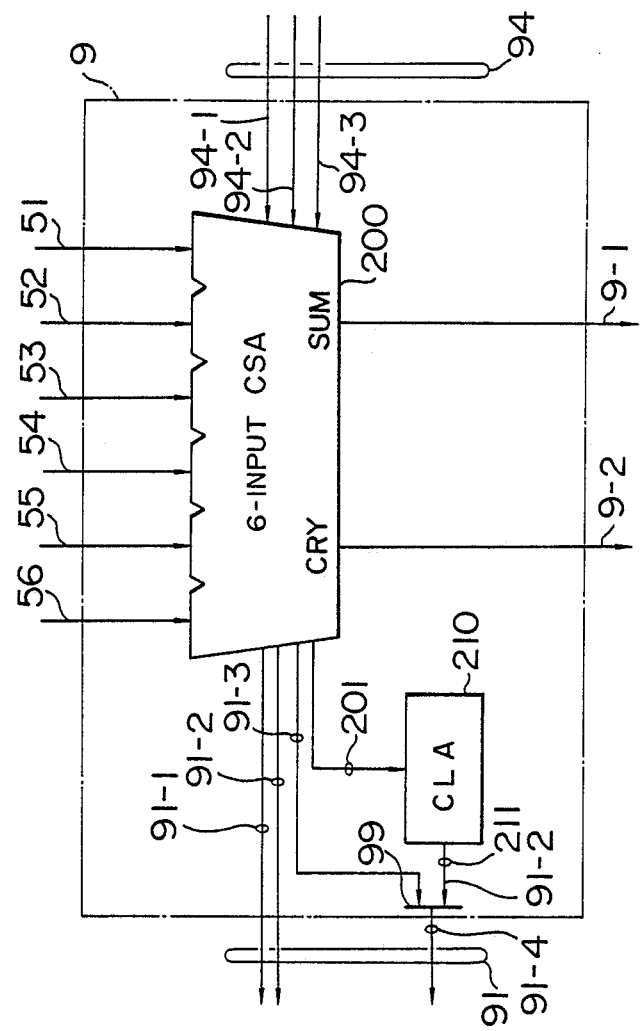
FIG. 7 is a diagram used to explain the CSA unit used in the multiplication circuit of FIG. 4.

FIG. 7 shows the arrangement of the CSA 9 in FIG. 4. The CSA unit 9 consists of a 6-input CSA 200 which receives the sum components 53 and 55 and carry components 54 and 56 of the partial products which have been produced a half machine cycle before and the partial sum 51 and partial carry 52, and a CLA (carry look ahead circuit) 210 which produces a carry signal 211 from the value which is a sum of the partial products 55 and 56, partial sum 51 and partial carry 52 provided by the CSA 200. The signal lines 91-1, 91-2 and 91-4 are for passing the carries of the CSA 9 to the CSA 10, and the signal lines 94-1, 94-2 and 94-3 are for passing the carries of the CSA 12 to the CSA 9. A selector 99 is used to output the carry created as a result of summation for the hatched portions in FIG. 2 onto the signal line 91-4, and it selects the carry on the signal line 211 when the CSA 200 receives the low-order half of the product for the lowest-order bits portion $a_0$ of the multiplicand and the multiplier $b_0$, or otherwise it selects the carry on the signal line 91-3, to be placed on the signal line 91-4. The remaining CSAs 10, 11 and 12 in FIG. 4 have exactly the same arranagement as of the CSA 9.

Figure 8:
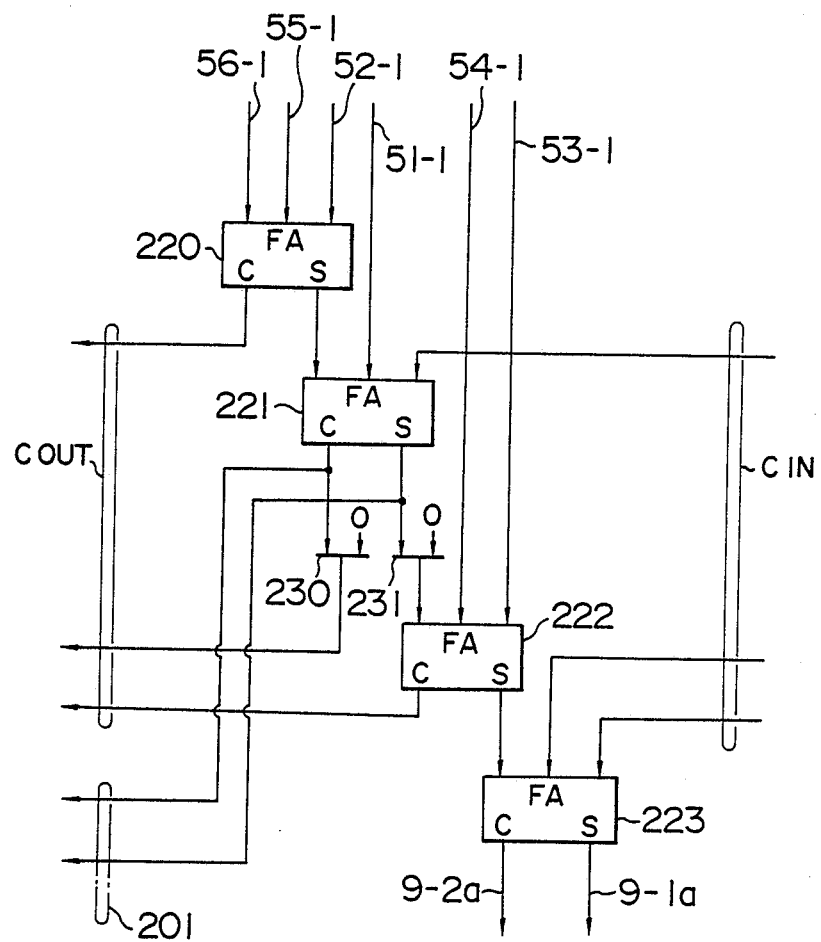
FIG. 8 is a diagram used to explain the 6-input CSA in the CSA unit shown in FIG. 7.

FIG. 8 shows the arrangement of one bit section of the 6-input CSA unit 200 in FIG. 7, and it consists of full adders (FAs) 220 through 223 and selectors 230 and 231. In the figure, the signal lines 51-1, 52-1, 53-1, 54-1, 55-1 and 56-1 correspond to a specific bit in the signal lines 51 through 56 in FIG. 7. The signal lines CIN are for the carries from the right-adjacent bit sections, while the signal lines COUT are for the carries to the left-adjacent bit sections. The signal lines 9-1a and 9-2a are a specific bit of the signal lines 9-1 and 9-2 in FIG. 7.

The FAs 220 and 221 produce invariably one bit portion of the input data 201 in FIG. 7. The selectors 30 and 231 are used to make "0" inputs from the FA 221 so that the operation of the FAs 222 and 223 is correct in calculating the carries of the hatched portions in FIG. 2. For example, when the sum and carry components of $a_0 \cdot b_0 - L$ are placed on the signal lines 56-1 and 55-1, the sum and carry components of $a_1 \cdot b_1 - U$ are placed on the signal lines 54-1 and 53-1, and the sum and carry components from the registers 23-1 and 23-2 are placed on the signal lines 51-1 and 52-1 in the former half of the second machine cycle in FIG. 5, the CSA 9 recognizes the entry of the lowest-order bit portion of the multiplicand and causes the selectors 230 and 231 to provide "0" outputs instead of the outputs of the FA 221. Accordingly, summation for $a_0 \cdot b_0 - L$ by the FAs 220 and 222 takes place separately from summation for $a_3 \cdot b_3 - U$ by the FAs 222 and 223, with the result of the latter summation being sent over the lines 9-1 and 9-2, the result of the former summation being sent over the line 201 to the CLA 210, and the carry from the CLA 210 being sent over the line 91 to the CSA 10.

Next, another embodiment of this invention will be described using FIGS. 9 through 12.

Figure 9:
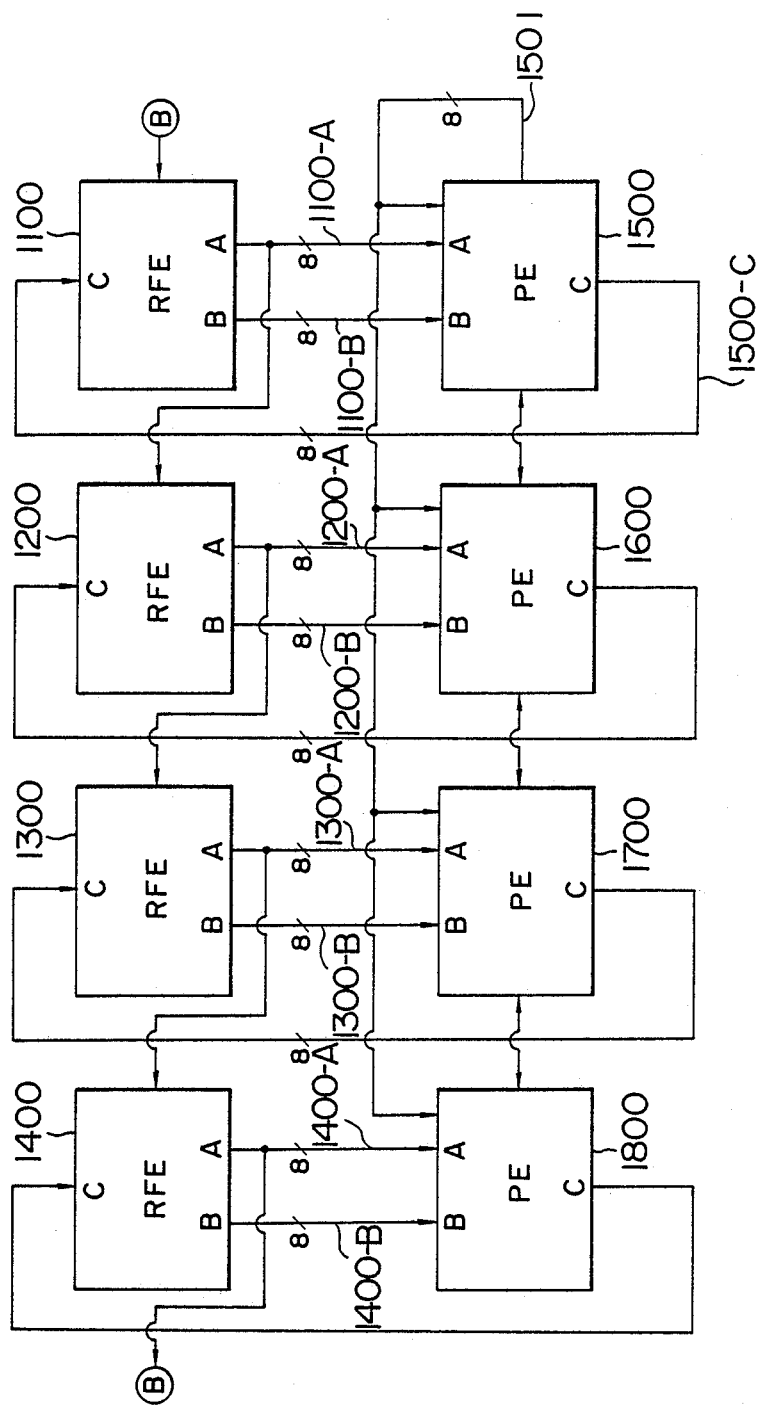
FIG. 9 is a block diagram of an operational processor including the multiplication circuit in accordance with another embodiment of this invention.

FIG. 9 shows an operational processor including the 32-bit multiplication circuit according to this invention. The processor consists of register file elements (RFEs) 1100 through 1400 and processor elements (PEs) 1500 through 1800, each including a shifter, an ALU and a multiplication circuit. Usual operational processes are carried out for a pair of data read out through ports A and B of RFEs 1100–1400 by the shifters and ALUs in the PEs 1500–1800, with the operational result being stored in the RFEs 1100–1400.

Next, the multiplying operation by the arrangement of FIG. 9 will be described using FIG. 10. For simplicity of explanation, a multiplicand is termed $a_0$, $a_1$, $a_2$ and $a_3$ in the order from the lowest-order byte to the highest-order byte, and in the same way a multiplier is termed $b_0$, $b_1$, $b_2$ and $b_3$.

In the first machine cycle of the multiplying operation (T1-1 and T1-2 in FIG. 10), the multiplicand is read out through the A ports of RFEs 1100–1400, and $a_0$, $a_1$, $a_2$ and $a_3$ are placed on the signal lines 1100-A, 1200-A, 1300-A and 1400-A, respectively. The multiplier is read out through the B ports, so that $b_0$, $b_1$, $b_2$ and $b_3$ are placed on the signal lines 1100-B, 1200-B, 1300-B and 1400-B, respectively. At this time, the multiplicands $a_0$–$a_3$ are rotated to the left-adjacent RFEs and latched in the multiplicand registers. (The RFE 1400 has a left-adjacent RFE of RFE 1100.) The multipliers $b_0$–$b_3$ are latched in the multiplier registers in the PEs 1500–1800.

In the former half of the second machine cycle (T2-1 in FIG. 10), the multiplicands rotated left by one byte are outputted to the A ports of RFEs 1100–1400, and the multiplicands which have been outputted to the A ports a half machine cycle before are outputted to the B ports. The multipliers in the PEs 1500–1800 are shifted right by one byte by passing the multipliers which have been latched a half machine cycle before on to the right-adjacent PEs. A byte of multiplier ($b_0$) outputted from the PE 1500 is sent over the signal line 1501 to the PEs 1500–1800. Each multiplication circuit in the PEs 1500–1800 implements the multiplying operation for the multiplicand entered through the A and B ports and the multiplier entered through the signal line 1501.

Figure 10:
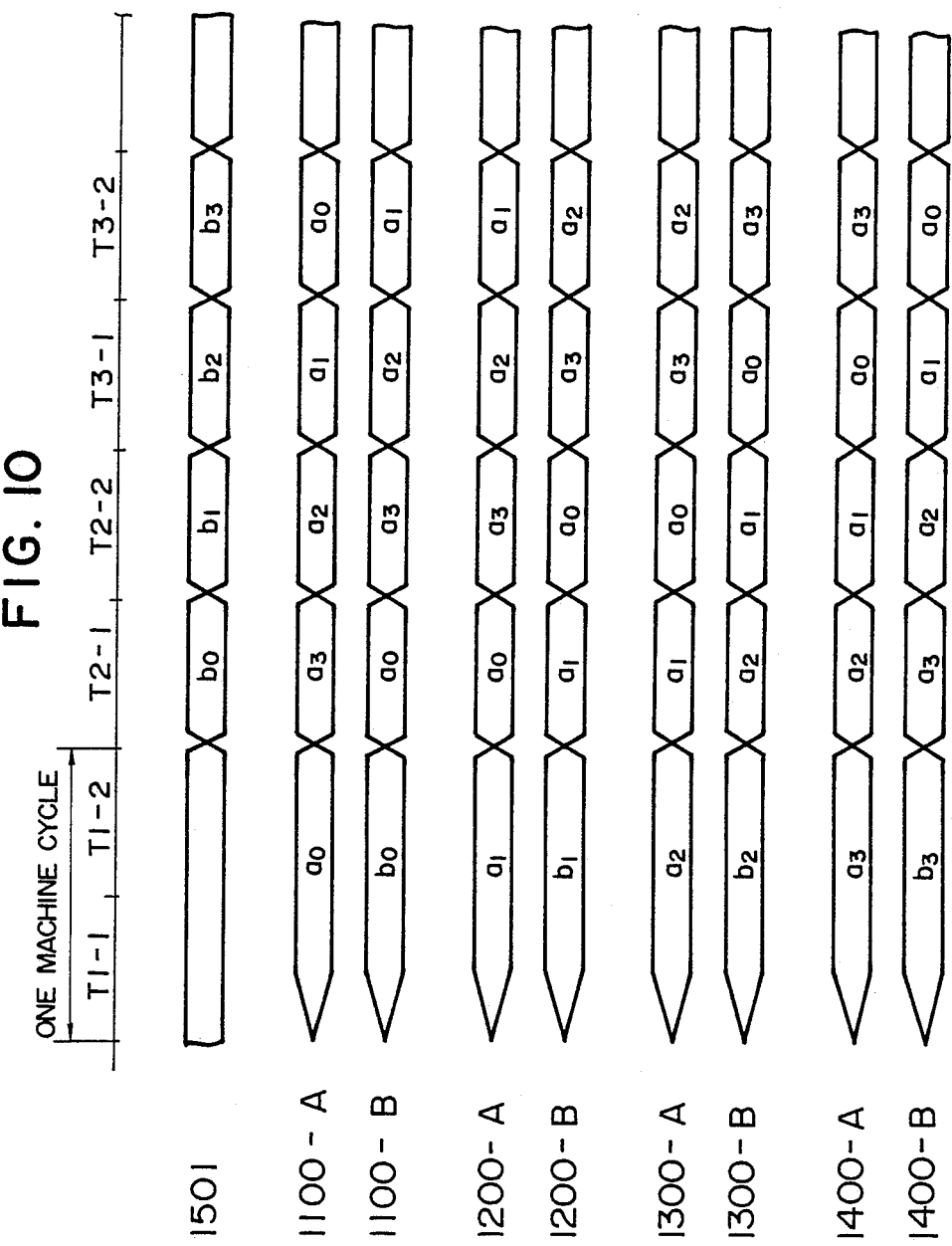
FIG. 10 is a timing chart of the operational process carried out by the operational processor shown in FIG. 9.

In the same manner, in the remaining half machine cycles T2-2, T3-1 and T3-2 in FIG. 10, the multiplicands which have been outputted half a machine cycle before and rotated left by one byte are placed on the A and B ports of RFEs 1100–1400, and the multipliers which have been latched in the multiplier registers after being right shifted by one byte are placed on the signal line 1501 sequentially, and the multiplying operation is carried out by the multiplication circuits in the PEs 1500–1800.

In the fourth machine cycle, the multiplication circuits in the PEs 1500–1800 produce the final partial sum and partial carries and store the results in the ALU input registers, and the ALUs are caused to sum the partial sums and partial carries.

In the fifth machine cycle, the multiplication result produced by the ALUs is stored in the RFEs 1100–1400 and the multiplying operation is completed.

Figure 11:
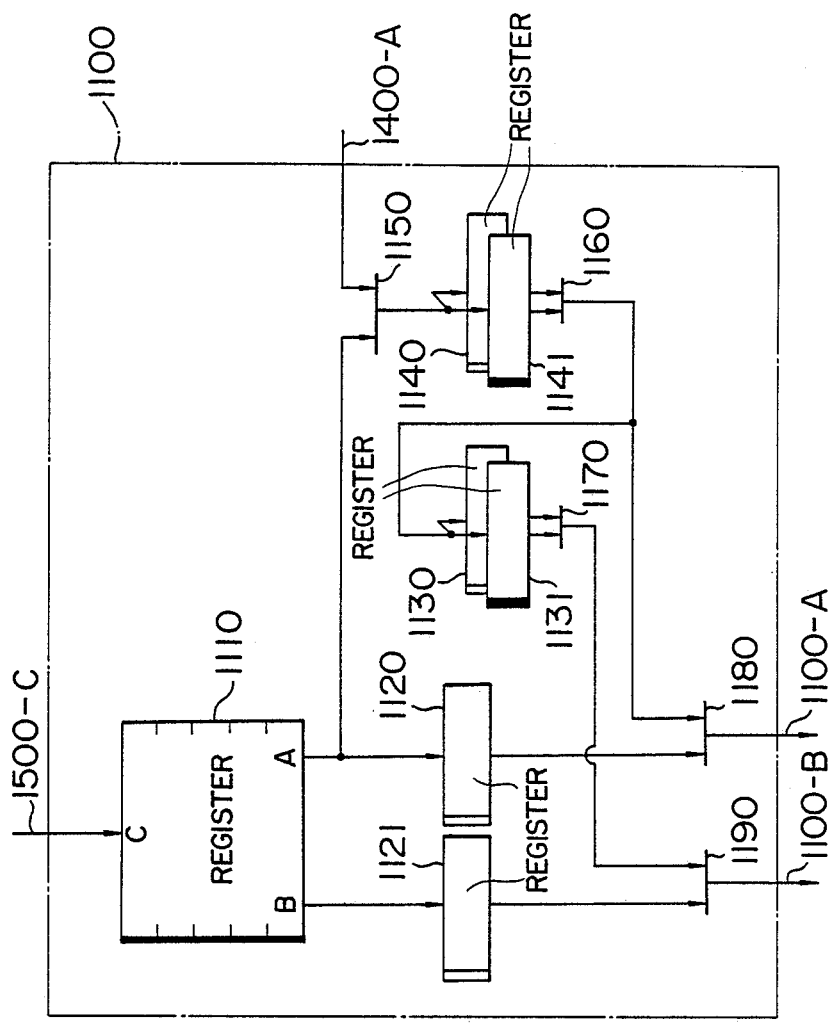
FIG. 11 is a block diagram of the register file element used in the operational processor shown in FIG. 9.

FIG. 11 shows the arrangement of the RFE 1100 in FIG. 9. (The remaining RFEs 1200–1400 have exactly the same arrangement.) The RFE 1100 consists of an 8-bit register file 1110, an A-port readout register 1120, a B-port readout register 1121, A-port output multiplicand registers 1140 and 1141, B-port output, multiplicand registers 1130 and 1131, and 2-to-1 selectors 1150, 1160, 1170, 1180 and 1190. The registers 1120, 1121, 1130 and 1140 are through-latches which are enabled in the former half of each machine cycle, and the registers 1110, 1131 and 1141 are through-latches which are enabled in the latter half of each machine cycle. In a usual multiplication process, the selectors 1180 and 1190 read out the contents of the register file readout registers 1120 and 1121 onto the signal lines 1100-A and 1100-B, and the operational result produced by the PE 1500 is received through the signal line 1500-C.

Next, the operation of the multiplication process will be described.

In the former half of the first machine cycle (T1-1 in FIG. 10), the multiplicand $a_0$ and multiplier $b_0$ are read from the A port and B port of the register file 1110 into the registers 1120 and 1121, respectively. At this time, the selector 1150 selects the A-port output of the register file 1110 and latches it in the register 1140. The selectors 1180 and 1190 are set to select the outputs of the registers 1120 and 1121.

In the latter half of the first machine cycle (T1-2 in FIG. 10), the selector 1150 selects the A-port output 1140-A ($a_3$) of RFE 1140 and latches it in the register 1141, and the selector 1160 selects the output ($a_0$) of the register 1140 and latches it in the register 1131.

In the second and third machine cycles, the selectors 1150, 1180 and 1190 select the signal line 1400-A, the output of the selector 1160 and the output of the selector 1170, respectively, and the selectors 1160 and 1170 select the outputs of the registers 1141 and 1131 in the former half of the machine cycles and select the outputs of the registers 1140 and 1130 in the latter half of the machine cycles, and the outputs as shown at T2-1 and T3-2 in FIG. 10 are obtained on the signal lines 1100-A and 1100-B.

Figure 12:
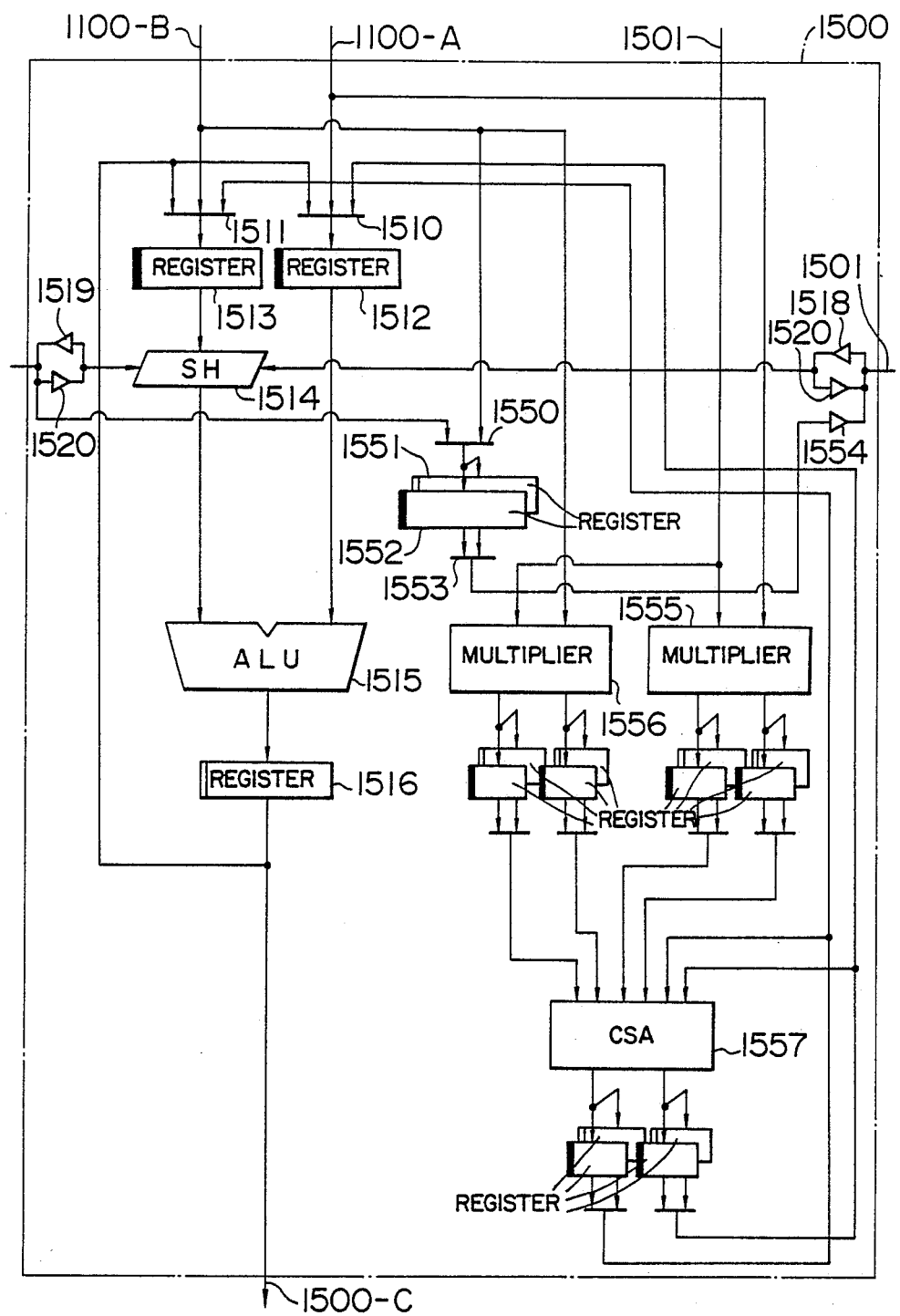
FIG. 12 is a block diagram of the processor element used in the operational processor shown in FIG. 9.

FIG. 12 shows the arrangement of the PE 1500 in FIG. 9. (The remaining PEs 1600–1800 have exactly the same arrangement.) The PE 1500 consists of an A-port input register 1512, a B-port input register 1513, a shifter (SH) 1514 operative to shift the contents right or left by eight bits, an 8-bit ALU 1515, a register 1516 for latching the ALU output, multiplier registers 1551 and 1552, shift-operation input gates 1518 and 1521, output gates 1519, 1520 and 1554, 8-bit multiplying units 1555 and 1556 and associated output latch registers, a 6-input CSA 1557 and associated output latch register, and selectors 1510, 1511, 1550 and 1553. Among these components the 6-input CSA 1557 is exactly the same as described on FIGS. 7 and 8.

In a usual operational process, the selectors 1510 and 1511 select the signal lines 1500-A and 1500-B and latch the inputs in the registers 1512 and 1513. Following the shift operation by the SH 1514, the ALU 1515 implements the operation and latches the result in the register 1516. The latched data is sent over the signal line 1500-C to the RFE 1100.

Next, the operation of the multiplication process will be described.

In the latter half of the first machine cycle (T1-2 in FIG. 10), the selector 1550 selects the multiplier $b_0$ received on the signal line 1100-B and latches it in the register 1552.

In the second and third machine cycles, the gates 1519 and 1520 are brought to a high-impedance state, the gate 1554 is enabled for output and the selector 1550 is set to select data from the PE 1600, so that the selector 1553 selects the output of the register 1552 in the former half of the cycles or selects the output of the register 1551 in the latter half of the cycles, and the output as shown at T2-1 through T3-2 in FIG. 10 is obtained on the signal line 1501.

Through the foregoing operations, the multiplication circuit including the 8-bit multiplying units 1555 and 1556 and 6-input CSAs 1557, performs the multiplication process and as shown in FIG. 2.

In the fourth machine cycle, the selectors 1510 and 1511 select the partial sum and partial carry produced by the 6-input CSA 1557, and the ALU 1515 sums these values to provide the multiplication result.

While specific embodiments of the present invention have been shown and described, it will be apparent to those skilled in the art that various changes and modifications may be made without departing from the present invention in its broader aspects.

We claim:

1. A multiplication circuit comprising:
   a first register for holding a multiplier having a length of 2m-by-n bits;
   first means for sequentially outputting n sets of 2m bits of the multiplier from said first register, one set at one time;
   decoder means for decoding a set of bits taken out by said first means;
   a second register for holding a multiplicand having a length 2m-by-n bits, said second register including shift means operating to shift the bit position of the multiplicand by 2m-bits in the ascending direction of bit position cyclically to produce a 2m-bit output for each multiplying operation by each ultiplier set;
   n multiplying units, each corresponding to one of the n sets of 2m-bit outputs from said shift means and each implementing multiplication for the 2m-bits of the multiplicand from said shift means and the output of said decoder means;
   n adding units, each corresponding to one of said n multiplying units, each adding unit incuding an adder and registers for holding a sum and carry produced by said addeer, each adding unit adapted for implementing summation for a high-order half bit portion of the output of the corresponding multiplying unit, a low-order half bit portion of the output of the cyclically next higher-order multiplying unit with respect to the corresponding multiplying unit and the contents of said register, with the result of the summation being held in said register, summation for the contents of said register and a low-order half bit portion of a product for a set of bits of the lowest-order portion of the multiplicand, among the multiplication results from multiplying units, and a sequentially taken out multiplier being carried out merely for producing a carry output, separately from summations for high-order half bit portions of the outputs of the cyclically next lower-order multiplying units; and
   summing means for summing respectively sums and carries held in the registers of said adding units produced as a result of summations for all multiplication results, and outputting the result of the multiplying operation.

2. A multiplication circuit according to claim 1 further comprising register units for holding the outputs of said multiplying units, said adding units adapted for implementing the summing process by fetching the outputs of multiplying units held in said register units, said multiplying units implementing the next multiplying process while said adding units implement the summing process.

3. A multiplication circuit according to claim 1 wherein 2n of said multiplying units are provided, two multiplying units in each of n-sets of multiplying units operating identically, two multiplying units being connected to each of said adding units separately.

4. A multiplication circuit according to claim 3 further comprising register units for holding the outputs of said multiplying units, said adding units adapter for implementing the summing process by fetching the outputs of multiplying units held in said register units, said multiplying units implementing the next multiplying process while said adding units implement the summing process.

* * * * *